United States Patent [19]

Opitz et al.

[11] Patent Number: 4,585,459
[45] Date of Patent: Apr. 29, 1986

[54] PROCESS FOR PREPARING LIQUID LOW-SALT AQUEOUS REACTIVE DYESTUFF COMPOSITIONS

[75] Inventors: Konrad Opitz, Liederbach; Günther Schwaiger, Frankfurt am Main, both of Fed. Rep. of Germany

[73] Assignee: Hoechst Aktiengesellschaft, Fed. Rep. of Germany

[21] Appl. No.: 719,769

[22] Filed: Apr. 4, 1985

[30] Foreign Application Priority Data

Apr. 9, 1984 [DE] Fed. Rep. of Germany ....... 3413315

[51] Int. Cl.$^4$ .............................................. C09B 67/00
[52] U.S. Cl. .................................... 8/527; 8/549; 8/685; 534/575; 534/618; 534/652
[58] Field of Search ............................... 8/527, 549

[56] References Cited

U.S. PATENT DOCUMENTS

| 4,072,463 | 2/1978 | Schlafer et al. | 8/527 |
| 4,078,884 | 3/1978 | Opitz et al. | 8/527 |
| 4,149,850 | 4/1979 | Schlafer et al. | 8/549 |
| 4,315,865 | 2/1982 | Hoyer et al. | 534/793 |
| 4,336,190 | 6/1982 | Schwaiger et al. | 8/549 |
| 4,443,224 | 4/1984 | Opitz | 8/527 |

FOREIGN PATENT DOCUMENTS

| 1194504 | 6/1970 | United Kingdom . |
| 2079771 | 1/1982 | United Kingdom . |

Primary Examiner—A. Lionel Clingman
Attorney, Agent, or Firm—Connolly and Hutz

[57] ABSTRACT

A process is described for separating sodium sulfate from aqueous solutions, containing less than 2% by weight of chloride, of certain fiber-reactive copper-formazan dyestuffs wherein this dyestuff solution is cooled down to a temperature between +5° C. and −15° C. In the course of the cooling the sodium sulfate precipitates in the form of the decahydrate and can be separated off in conventional manner, for example by filtration. The products obtained in this way are liquid low-salt aqueous copper-formazan dyestuff preparations which contain less than 4% by weight of sodium sulfate.

11 Claims, No Drawings

PROCESS FOR PREPARING LIQUID LOW-SALT AQUEOUS REACTIVE DYESTUFF COMPOSITIONS

The dyeing and printing of nitrogen-containing fiber materials, such as wool, silk or synthetic polyamide fibers, and especially of fiber materials in natural or regenerated cellulose and of blend fabrics containing these fibers is widely effected with reactive dyestuffs which are used in the form of dry powders containing non-coloring standardizing agents. In addition to the fact that, owing to the powder form, these dyestuff powders give rise to unpleasant dusting, they are difficult to mix up into print pastes and padding or dyeing liquors especially for the reason that, owing to the fact that they contain dedusting agents on mineral oil bases, which can lead to oily deposits, many dyestuff powders have poor wetting properties and as a result tend to form lumps or are insufficiently soluble.

These disadvantages of dyestuff powders are noticeable in particularly unpleasant fashion in the case of those dyeing methods where it is necessary to attain high dyestuff concentrations at low temperatures, as, for example, in the case of the short-time pad-batch method. In this area, dyestuffs are preferably in the form of liquid preparations, which are markedly superior to pulverulent preparations. In the case of less than readily water-soluble reactive dyestuffs, marketable liquid preparations are obtained by using solubilizers or combinations of solubilizers with anionic dispersants (see for example British Pat. No. 1,060,063, German Offenlegungsschrift No. 2,529,658 and U.S. Pat. No. 4,432,224). Of practical interest, however, are in particular liquid dyeing preparations where water is the sole solvent and dyestuff contents are high; yet these can only be prepared with readily water-soluble reactive dyestuffs. Preparations of this type are known for example from U.S. Pat. Nos. 4,072,463, 4,078,884 and 4,149,850. High salt contents, however, are undesirable, since they can lower the solubility of the dyestuff or, in the case of sulfate salts, precipitates of sodium sulfate decahydrate can appear at very low storage temperatures, which are no longer reversible at room temperature.

There are then a number of reactive dyestuffs which are sufficiently water-soluble, but which, owing to an excessively high, synthesis-derived salt content, lack sufficient solubility for a marketable liquid, purely aqueous composition. This group includes the fiber-reactive copper-formazan dyestuffs which are disclosed in German Offenlegungsschriften Nos. 1,719,081 and 2,945,537 and have the general formula (1)

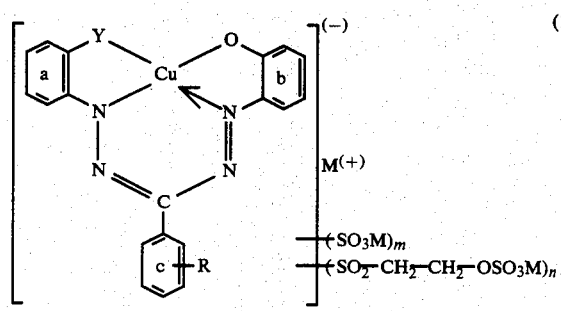

in which m denotes the number 1, 2 or 3,
n stands for the number 1 or 2,
M is an alkali metal, such as sodium, potassium or lithium, in particular sodium,
R stands for hydrogen, chlorine, methyl, ethyl, methoxy, ethoxy or carboxy,
Y denotes a —O— or —COO— group and
the sulfo group(s) is or are bonded to the benzene nuclei a, b and/or c and the β-sulfatoethylsulfonyl group(s) is or are bonded to the benzene nuclei a and/or b.

Attempts have consequently been made to reduce the undesirable high salt contents. However, such methods as are described in the literature are associated with appreciable disadvantages. For instance, excess sulfuric acid from sulfonations, sulfatizations (esterification) and diazotizations is neutralized with calcium carbonate and separated off in the form of sparingly soluble calcium sulfate (gypsum). These disadvantages are that the gypsum residue needs to be dumped after and be washed carefully beforehand to avoid, inter alia, dyestuff losses; said wash results in a very dilute dyestuff solution, the concentration or drying of which requires a correspondingly high amount of energy.

A fundamentally different method of removing unwanted and interfering salts underlies, for example, the membrane separation processes described in British Pat. No. 1,359,898 or in German Offenlegungsschrift No. 2,948,292. These processes likewise have appreciable disadvantages. Additional costly apparatus is necessary, and in practice it is only possible to remove chlorides, while sulfates cannot be practically separated from reactive dyestuffs by membrane separation processes since the molecular weight ratio of 1:10 between sulfate anion and dyestuff anion, which is required for a successful separation of salt and dyestuff, is not reached by a long way, in particular since the molecular weight of the sulfate ion in this ratio is effectively the molecular weight of the hydrated sulfate ion, so that, on the assumption that its hydrate envelope contains only 5 molecules of $H_2O$, only dyestuffs having a molecular weight greater than 2,000 could be separated from sulfate ions by membrane separation processes. However, the molecular weights of most reactive dyestuffs are within the range between 300 and 1,000 and are higher only in exceptional cases. If, nevertheless, membranes which are permeable to sulfate ions are used, it is necessary to accept high dyestuff losses. A further disadvantage of membrane separation processes is the salt-containing waste water which inevitably results.

For instance, British Patent Application publication No. 2,079,771 discloses a process for separating sodium sulfate from solutions of acid dyestuffs of the azo series, wherein the sodium sulfate is separated off by addition of water-miscible organic compounds which generally serve as solvent. Monoethylene glycol, its methyl and ethyl ethers, and ethanolamines are mentioned as such compounds. These "solvents", however, in addition to lowering the solubility of the sodium sulfate, can also lower the solubility of the dyestuffs, which is of course undesirable; certainly, they cannot be used for fiber-reactive dyestuffs, since they react with the fiber-reactive groups when the fiber-reactive dyestuffs are applied to and fixed on the fiber, if not before, thereby reducing the color yield.

It is thus the object of the present invention to find a way of processing the abovementioned and defined copper-formazan dyestuffs of the general formula (1) into hitherto not yet disclosed liquid solutions which have a sufficiently high concentration of dyestuff and are substantially free of electrolyte salts, such as alkali metal chlorides, in particular alkali metal sulfates, and are very suitable for use as liquid dye preparations having a long shelf life.

This object is achieved with the present invention. The present invention accordingly provides an ecologically safe and economical process for preparing liquid low-sulfate aqueous dyeing preparations (compositions) of reactive dyestuffs of the abovementioned and defined general formula (1), which does not require additional costly apparatus and in which the separated-off sulfate does not appear in disadvantageous manner as a waste material. The process according to the invention comprises cooling an aqueous solution of reactive dyestuffs of the general formula (1), which contains sodium sulfate and less than 2% by weight and preferably less than 1% by weight of chloride (calculated as chloride ions), down to a temperature between +5° C. and −15° C., preferably between +3° C. and −10° C., and separating off the precipitated sodium sulfate decahydrate (Glauber salt), for example by filtration or centrifugation.

The process according to the invention thus makes it possible to use aqueous solutions of dyestuffs of the general formula (1), to prepare low-sulfate concentrated aqueous solutions of the abovementioned reactive dyestuffs of the general formula (1), having a sodium sulfate ($Na_2SO_4$) content of less than 5% by weight, preferably less than 4% by weight and in particular of at most 3% by weight.

The starting solutions used of fiber-reactive dyestuffs of the general formula (1), which contains sodium sulfate and which are to be freed of substantial portions of said sodium sulfate in the process according to the invention and in the course of said process are concentrated owing to the inclusion of water of crystallization in the sodium sulfate (Glauber salt), are the conventionally obtainable synthesis solutions of these dyestuffs. In the synthesis, the acid used in the individual reaction steps, in particular in the diazotization reaction, is preferably sulfuric acid, to avoid introducing chloride ions into the system. This is because an elevated chloride ion content of above 2% by weight makes it difficult to separate off the sodium sulfate decahydrate: it prevents the ready crystallization of the Glauber salt. The starting solutions used can also be those synthesis solutions which initially had a relatively high chloride content and from which the chloride has been removed beforehand, for example by one of the abovementioned membrane separation processes, until the chloride content is less than 1% by weight.

The starting solutions (synthesis solutions) generally have a pH between 3 and 7 and can contain buffer substances, such as, for example, sodium dihydrogenphosphate, disodium hydrogenphosphate, sodium oxalate, sodium acetate or sodium borate, which are able to set and maintain a pH of 3 to 7, plus other auxiliaries, for example defoamers, and/or extremely low amounts of inert substances carried over from the synthesis.

To the low-sulfate solutions obtainable according to the invention and containing the fiber-reactive copper-formazan dyestuff of the general formula (1), can also be added buffer substances which are able to establish and maintain a pH of 3 to 7, subsequently, which is preferable, furthermore the preservatives customary for concentrated liquid preparations or other auxiliaries, such as anionic or non-ionic wetting agents, dyeing auxiliaries and if desired low amounts of dispersants.

The aqueous dyestuff solutions, of the general formula (1), of low sodium sulfate content and obtainable by the process according to the invention can be used in dyeing directly as liquid compositions, if desired after addition of the abovementioned buffer substances and other auxiliaries. Since, as a consequence of the method of preparation, the sulfate content of these concentrated dyestuff solutions is at low temperatures still at the upper limit of sulfate solubility, these solutions which have a concentrated or almost saturated sodium sulfate concentration are advantageously subsequently rediluted with water to a certain extent in order to prevent sodium sulfate decahydrate from crystallizing out when these concentrated solutions obtainable by the process are stored at very low, such as winterly, temperatures. This is because the crystallization of Glauber salt in commercial liquid compositions leads to disadvantages in use, since the sodium sulfate decahydrate dissolves fast enough only if the preparation is heated to above the melting point of the decahydrate.

The present invention thus provides not only aqueous dyestuff solutions of one or more dyestuffs of the general formula (1), which have a total dyestuff content of 5 to 45% by weight and an $Na_2SO_4$ content of less than 5% by weight and preferably less than 4% by weight and which are obtainable by the process according to the invention, but also in particular, obtainable therefrom, advantageous liquid dye compositions which contain 5 to 40% by weight of dyestuff of the general formula (1), less than 4%, preferably at most 3%, by weight of $Na_2SO_4$, 2% by weight or less than 2% by weight and preferably less than 1% by weight of chloride ions and optionally one or more buffer substances of in total up to 3% by weight, and have a pH between 3 and 7.

The liquid low-salt aqueous dyestuff compositions of fiber-reactive copper-formazan dyestuffs of the general formula (1) according to the invention are highly stable to storage and even after storage for a number of weeks at room temperature or at temperatures of up to 50° C. or at low temperatures, such as temperatures of +5° C. to −5° C., lead to no precipitations whatsoever, provided that, in the preparations obtainable by the process, the low sodium sulfate content does not reach the solubility limit at the lower temperatures; in particular, the solubility of the dyestuff remains unaffected by this, as does the reactivity of the dyestuff with the fiber, so that there is no loss of dyeing strength. For that reason, as already mentioned, the liquid preparations according to the invention can be used directly for preparing dyeing liquors and print pastes which can be used for dyeing the materials customarily dyeable with these dyestuffs, such as in particular carboxamido- and/or hydroxy-group containing fiber materials.

The sodium sulfate decahydrate separated off by the process according to the invention can be advantageously processed further with still adherent mother liquor, i.e. without the prior wash, namely in the preparation of dyestuff powders of the dyestuff of the general formula (1) by adding it to another synthesis solution of this dyestuff which is processed into a powder by drying, for example spray-drying. These dyestuffs are thus obtained in the form of powder formulations having a higher sodium sulfate content. These formulations can be desirable in dyeing and help to reduce the amount of sodium sulfate which is additionally added by the dyer to the dyebath or even eliminate it completely. On the contrary, the process according to the invention makes it possible to obtain low-salt concentrated dyestuff solutions of these dyestuffs, which offer advantages to the dyer and user, since the need for weighing out pulverulent substances and dissolving and making them up into dyebaths is dispensed with, and with which it is possible to make up the dyebath or print paste rapidly and conveniently, as a rule by diluting with water or an aqueous thickening which can already contain appropriate dye auxiliaries. More particularly, in the case of cold-dyeing methods, the otherwise necessary hot-dissolving of the pulverulent dyestuff, followed by a cooling period for the solution, is avoided.

Of the dyestuffs of the general formula (1) which are present in the solutions used according to the invention and/or in the aqueous preparations according to the invention, preference is given to dyestuffs of the general formula (2)

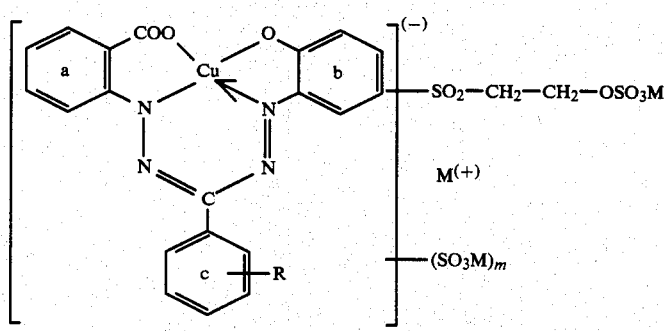

in which M, m and R have the abovementioned meanings and the sulfo group(s) is or are bonded to the benzene nuclei a, b and/or c, each of these benzene nuclei having not more than one sulfo group.

However, preference is given in particular to copper-formazan dyestuffs of the general formula (3)

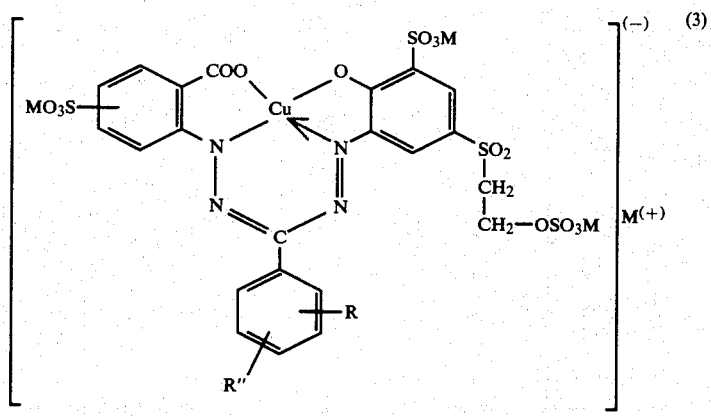

in which M and R have the abovementioned meanings and R" stands for a hydrogen atom or a sulfo group, but R and R" both preferably denote a hydrogen atom.

The following Examples serve to illustrate the invention. The parts and percentages therein are by weight, unless otherwise stated.

EXAMPLE 1

(a) 317 parts of an aqueous solution of the dyestuff of the formula (4)

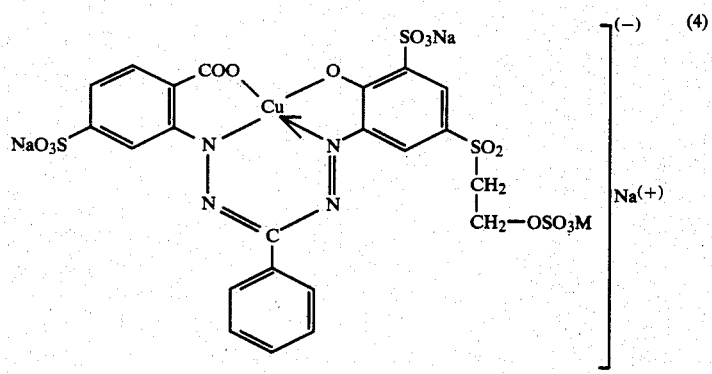

which was obtained in a known manner or analogously to a known manner of preparing copper-formazan dyestuffs and contained 11.25% of dyestuff of the formula (4), 0.66% of sodium chloride and 15.5% of sodium sulfate (Na$_2$SO$_4$), was cooled down with occasional stirring to a temperature of +2° C. The solution was maintained at said temperature for a prolonged period until the sodium sulfate content of the solution had dropped to below 5%. The precipitated Glauber salt, a total of 87 parts of $Na_2SO_4 \times 10H_2O$, was filtered off. It can be added together with the adherent mother liquor, i.e. without further washing, to another batch of this dyestuff which is to be processed into a solid dyestuff powder by drying, such as spray-drying.

The 230 parts of filtrate obtained contained 15.5% of the dyestuff of the formula (4), 0.91% of sodium chloride and 4.9% of sodium sulfate ($Na_2SO_4$) and had a pH of 4.9. This liquid composition, stored in a sealed vessel, is stable to storage at 5°–20° C. of at least 6 months and at 50° C. of at least 6 weeks without precipitations. On addition of a buffer substance to stabilize the pH to between 3 and 7, moreover, there is no loss of dyeing strength, nor are there any hue changes in dyeings prepared with this preparation after different periods of storage. However, on cooling down the composition to below 0° C., the existing saturation in sodium sulfate causes formation of Glauber salt crystals.

(b) To obtain a satisfactory marketable composition in this respect, the solution obtained according to the invention can be diluted with water (for example with sufficient water as to produce a solution standardized in respect of other commercial dyestuffs), so that the result is a liquid preparation which contains extremely little sodium sulfate but still a sufficient concentration of dyestuff and which is still sufficiently stable to storage even at temperatures of 0° C. or a little below and does not lead to precipitations of sodium sulfate decahydrate.

For instance, to 230 parts of the filtrate, obtained according to the invention in (a), can be added 6 parts of sodium dihydrogenphosphate and 164 parts of water to obtain in this way 400 parts of a liquid dyeing preparation which contains 8.9% of the dyestuff of the formula (4), 2.7% of sodium sulfate ($Na_2SO_4$) and less than 0.5% of sodium chloride and has a pH of 4.7.

This liquid composition, stored in a sealed vessel, is stable to storage at 20° C. of at least 6 months and at 50° C. of at least 6 weeks without precipitation of sodium sulfate or dyestuff and without loss of dye strength and without change in the hue of the dyeings obtainable therewith. In particular, this liquid dyeing preparation is also storable for prolonged periods at low temperatures, for example for 2 weeks at 0° C., without sedimentation or precipitation.

(c) 4 parts of the pH-stabilized solution named in (b) were used in each case to prepare in known and conventional manner dyebaths, padded liquors and print pastes which, applied to and fixed on cotton in the manner customary for reactive dyestuffs, produce blue dyeings and prints which were just as strong as those prepared with 1 part of a powder formulation which contains 35.6% of the dyestuff of the formula (4), using in the same manner as above equal-concentration dyebaths, padded liquors or print pastes.

(d) If, on the other hand, the 317 parts of the starting dyestuff solution used above and (a) are directly standardized to 8.9% of dyestuff of the formula (4) with 6 parts of sodium dihydrogenphosphate and 77 parts of water, this preparation, if stored at 0° C., gives rise to sizeable sedimentation of sodium sulfate decahydrate after as short a time as one day, and on repeated application of this preparation the dyeings obtained fluctuate in dyeing strength, differing from the originally standardized dyeing strength value.

EXAMPLE 2

317 parts of the starting dyestuff solution referred to in Example 1(a) were cooled down to −5° C. to separate out the sodium sulfate, and said temperature was maintained for a prolonged period until the sodium sulfate content had dropped to below 3%. The precipitated Glauber salt (105 parts) was filtered off.

The filtrate obtained (212 parts), after addition of a stabilizing buffer substance, such as, for example, 2 parts of sodium dihydrogenphosphate, can be used as a stable liquid dyeing composition. This pH-stabilized preparation has a dyestuff content of 16.7% and a sodium sulfate ($Na_2SO_4$) content of 1.3% and a pH of 4.7. Stored in a sealed vessel, it has a shelf life of at least 6 months at 20° C. and of at least 6 weeks at 50° C. without precipitations and without loss of dyeing strength and without changes in the hue of the dyeings obtainable therewith. If temperatures of 0° C. are maintained for 2 weeks, there is no sedimentation or precipitation, neither of sodium sulfate decahydrate nor of dyestuff. However, as described in Example 1, the preparation can be diluted for standardization with water, so that it is also possible to obtain preparations which remain stable to storage below −5° C.

EXAMPLE 3

280 parts of an aqueous solution to the dyestuff of the formula (4), which was prepared analogously to known procedures and contained 12.7% of this dyestuff, 0.8% of sodium chloride and 14.9% of sodium sulfate, were cooled down with occasional stirring to −1° C. The solution was maintained at said temperature for a number of hours until the sodium sulfate content had dropped to below 3%. The precipitated 81 parts of sodium sulfate decahydrate were then filtered off; without washing they were fed as described in Example 12 into another batch for preparing a dyestuff powder of the dyestuff of the formula (4) by spray-drying.

The 199 parts of filtrate obtained had an $Na_2SO_4$ content of 3%; they were diluted with 5 parts of sodium dihydrogenphosphate and 96 parts of water. The resulting dyeing preparation which contained 11.9% of the dyestuff of the formula (4), 2.0% of sodium sulfate and about 0.7% of sodium chloride and had a pH of 4.5, can be used as a stable dyeing preparation directly for dyeing. Stored in a sealed vessel it has a shelf life at 20° C. of at least 6 months and at 50° C. of at least 6 weeks, without precipitations, without loss of dyeing strength and without change in hue. In particular, it can also be stored for prolonged periods at low temperatures, for example for 2 weeks at 0° C., without sedimentation or precipitation.

If, on the other hand, the 280 parts of starting dyestuff solution are likewise directly standardized to 11.9% of dyestuff with 5 parts of sodium dihydrogenphosphate and 77 parts of water, this dyeing preparation, if stored at 0° C., gives rise to sizeable sedimentation after as short a time as 1 day and the dyeings are of fluctuating dyeing strength, differing from the desired value.

EXAMPLE 4

290 parts of a solution of the dyestuff of the formula (4), which was prepared analogously to known procedures and contained 12.3% of this dyestuff, 0.4% of sodium chloride and 15.6% of sodium sulfate, were cooled down with occasional stirring to −4° C. and were maintained at this temperature for a prolonged period until the sodium sulfate content of the solution had dropped to below 2%. The precipitated Glauber salt (96 parts) was filtered off. The 194 parts of filtrate obtained had a sodium sulfate content of 1.55%. The solution can be stored at a temperature of 0° C. for a number of weeks without substances precipitating. It can advantageously be treated with, for example, 3 parts of sodium dihydrogenphosphate and 5 parts of water. The resulting liquid dye preparation which contains 17.8% of the dyestuff of the formula (4) and 1.5% of sodium sulfate and has a pH of 4.7, stored in a sealed vessel, is stable to storage at 20° C. of at least 6 months and at 60° C. of at least 6 weeks without precipitations, without loss of dyeing strength and without change in hue and in particular a very long shelf life at low temperatures, for example 2 weeks at 0° C., without sedimentation or precipitation. For that reason it is very highly suitable for use as a marketable liquid composition for preparing dyeing and prints.

If, on the other hand, an attempt is made to start from the 290 parts of the starting dyestuff solution mentioned and, by adding 3 parts of sodium dihydrogenphosphate and by removing the corresponding amount of water, for example by vacuum distillation, to obtain a liquid dye preparation having the same dyestuff content, the result is, on cooling at room temperature (about 20° C.), if not before, a nonfluent crystal mass.

EXAMPLE 5

310 parts of a solution of the dyestuff of the formula (5)

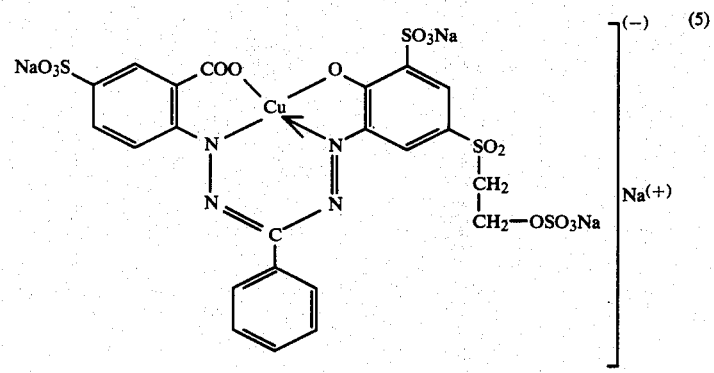

which was prepared analogously to known procedures and contained 14.5% of the dyestuff, 0.8% of sodium chloride and 14.1% of sodium sulfate, was cooled down with occasional stirring to $-2°$ C. The temperature was maintained for a number of hours until the sodium sulfate content of the solution had dropped to below 4%. The precipitated 79 parts of $Na_2SO_4 \times 10H_2O$ were then filtered off. The 231 parts of filtrate obtained had a sodium sulfate content of 3.9% and can be diluted by adding 4 parts of sodium dihydrogenphosphate and 65 parts of water. The result was 300 parts of a liquid dyeing preparation which contains 15% of the dyestuff of the formula (5) and 3% of sodium sulfate and has a pH of 4.8.

This liquid dyeing composition, stored in a sealed vessel, is stable to storage at 20° C. of at least 6 months and at 50° C. of at least 6 weeks, without precipitations, without loss of dyeing strength and without change in hue, in particular a very long shelf life at low temperatures, for example 2 weeks at 0° C., without sedimentation or precipitation.

If, on the other hand, an equally strong liquid dyeing preparation is prepared by, after addition of 4 parts of sodium dihydrogenphosphate, removing 14 parts of water from the 310 parts of the above starting dyestuff solution, for example by vacuum distillation, this dye preparation, on storage at 0° C., gives rise to marked sedimentation after as short a time as 1 day, and the dyeings obtained are of fluctuating dyeing strength differing from the desired value.

We claim:

1. A process for separating sodium sulfate from an aqueous solution, containing sodium sulfate and less than 2% by weight of chloride, of a dyestuff of the formula (1)

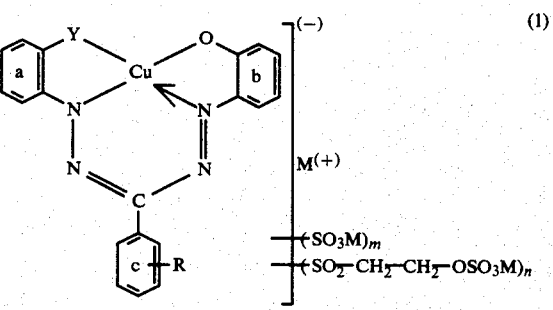

in which
m denotes the number 1, 2 or 3,
n stands for the number 1 or 2,
M represents an alkali metal, such as sodium, potassium or lithium, in particular sodium,
R stands for hydrogen, chlorine, methyl, ethyl, methoxy, ethoxy or carboxy,
Y denotes the —O— or —COO— group and
the sulfo group(s) is or are bonded to the benzene nuclei a, b and/or c and the β-sulfatoethylsulfonyl group(s) is or are bonded to the benzene nuclei a and/or b, which comprises cooling down the solution to a temperature between $+5°$ C. and $-15°$ C. and separating off the precipitated sodium sulfate decahydrate.

2. The process as claimed in claim 1 wherein the dyestuff present in the solution is a dyestuff of the formula (2)

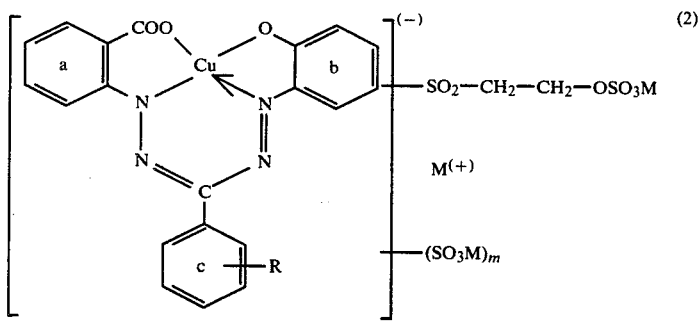
(2)

in which M, m and R have the meanings defined in claim 1 and the sulfo group(s) is or are bonded to the benzene nuclei a, b and/or c, each of these benzene nuclei having not more than one sulfo group.

3. The process as claimed in claim 1 wherein the dyestuff present in the solution is a dyestuff of the formula (3)

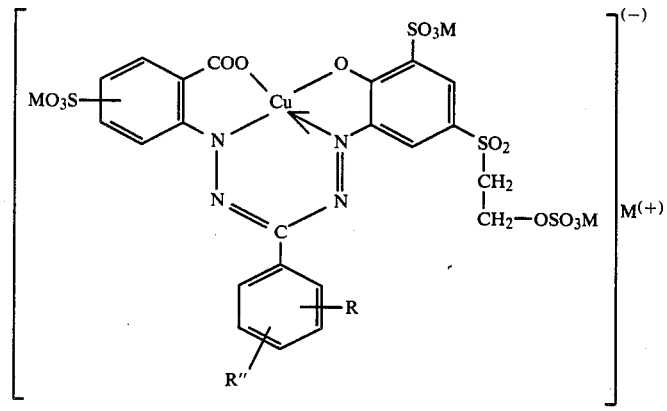
(3)

in which M and R have the meanings defined in claim 1 and R″ stands for a hydrogen atom or a sulfo group.

4. The process as claimed in claim 1 wherein the dyestuff present in the solution is a dyestuff of the formula

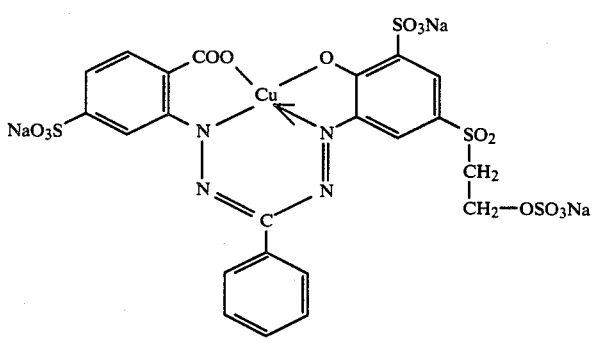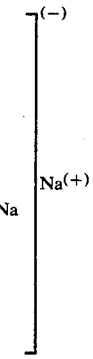

5. A dyestuff solution obtainable according to claim 1, which contains in total 5 to 45% by weight of one or more of the dyestuffs of the formula (1), less than 5% by weight of Na$_2$SO$_4$, 2% by weight or less than 2% by weight of chloride ions and optionally up to 3% by weight of (a) buffer substance(s), and has a pH between 3 and 7.

6. A liquid aqueous dye composition as claimed in claim 5 which contains less than 4% by weight of Na$_2$SO$_4$.

7. A liquid aqueous dye composition as claimed in claim 5 which contains less than 1% by weight of chloride ions.

8. A liquid aqueous dyestuff composition of copper-formazan compounds of the formula (1) defined in claim 1 which contains in total 5 to 40% by weight of one or more dyestuffs of the formula (1), less than 4% by weight of Na$_2$SO$_4$, 2% by weight or less than 2% by weight of chloride ions and optionally up to 3% by weight of (a) buffer substance(s), and has a pH between 3 and 7.

9. A liquid composition as claimed in claim 8 wherein the Na$_2$SO$_4$ content is at most 3% by weight.

10. A liquid preparation as claimed in claim 8 wherein the chloride ion content is less than 1% by weight.

11. The process as claimed in claim 3 wherein the dyestuff present in the solution is a dyestuff of the formula (3) in which R and R″ both denote a hydrogen atom.

* * * * *